(12) United States Patent
Choi

(10) Patent No.: US 12,437,658 B2
(45) Date of Patent: Oct. 7, 2025

(54) INTELLIGENT HIGH-TECH SYSTEM AND METHOD FOR AIRCRAFT GROUND GUIDANCE AND CONTROL

(71) Applicant: NST Co.,Ltd., Seoul (KR)

(72) Inventor: Byoung Kwan Choi, Osan-si (KR)

(73) Assignee: NST Co., Ltd., Seoul (KR)

( * ) Notice: Subject to any disclaimer, the term of this patent is extended or adjusted under 35 U.S.C. 154(b) by 154 days.

(21) Appl. No.: 18/554,794

(22) PCT Filed: Apr. 5, 2022

(86) PCT No.: PCT/KR2022/004822
§ 371 (c)(1),
(2) Date: Oct. 11, 2023

(87) PCT Pub. No.: WO2022/220461
PCT Pub. Date: Oct. 20, 2022

(65) Prior Publication Data
US 2024/0119850 A1    Apr. 11, 2024

(30) Foreign Application Priority Data

Apr. 15, 2021 (KR) .................... 10-2021-0049131

(51) Int. Cl.
*G08G 5/06* (2006.01)
*G08G 5/04* (2006.01)
(Continued)

(52) U.S. Cl.
CPC ................. *G08G 5/51* (2025.01); *G08G 5/80* (2025.01)

(58) Field of Classification Search
CPC .. G08G 5/51; G08G 5/80; G08G 5/26; G08G 5/22; G08G 5/55; G08G 5/52; G08G 5/54; G08G 5/727; B64F 1/002
See application file for complete search history.

(56) References Cited

U.S. PATENT DOCUMENTS 6,006,158 A * 12/1999 Pilley .................... G01S 5/0009
701/120

FOREIGN PATENT DOCUMENTS

EP        0613109 A1    8/1994
JP     2007-240190 A    9/2007
(Continued)

*Primary Examiner* — Brian P Sweeney
(74) *Attorney, Agent, or Firm* — NKL Law; Jae Youn Kim

(57) ABSTRACT

A system and method for aircraft ground guidance and control are characterized by: inputting to a server and managing the GPS coordinate values, representing fixed location information, of all airfield lights that are installed within an airfield and can be controlled and monitored; determining whether the real-time coordinates of a moving aircraft on radars cross the fixed coordinates of the airfield lights; and specifying the location of the aircraft if the coordinates of the aircraft cross the fixed coordinates of the airfield lights, and guiding and controlling the airfield lights in the path of the aircraft. Accordingly, provided are the benefits of managing the GPS coordinate values representing fixed location information of airfield lights input to a server, accurately identifying the location of a moving aircraft if the real-time coordinates of the moving aircraft on radars cross the fixed coordinates of the airfield lights, and guiding and controlling the aircraft and airfield lights.

11 Claims, 5 Drawing Sheets

(51) Int. Cl.
  *G08G 5/51* (2025.01)
  *G08G 5/80* (2025.01)

(56) References Cited

FOREIGN PATENT DOCUMENTS

| | | | | |
|---|---|---|---|---|
| KR | 10-2016-0090483 A | 8/2016 | | |
| KR | 10-1650905 B1 | 8/2016 | | |
| KR | 101656280 B1 * | 9/2016 | ............... | G08G 5/02 |
| KR | 10-2315546 B1 | 10/2021 | | |
| WO | WO 2016017883 A1 * | 2/2016 | ................ | B64F 1/18 |

* cited by examiner

INTELLIGENT HIGH-TECH SYSTEM AND METHOD FOR AIRCRAFT GROUND GUIDANCE AND CONTROL

TECHNICAL FIELD

The present invention relates to a system and method for aircraft ground guidance and control, and more specifically, to a system and method for aircraft ground guidance and control that enable a location that an aircraft passes to be accurately found and the aircraft and airfield lights to be guided and controlled.

BACKGROUND ART

With the gradual increase in the number of people using aircraft, the size of airports is increasing, the number of arrivals and departures of aircraft is increasing, and traffic near airport runways is becoming complicated. For these reasons, air control by operation of a controller is becoming more and more difficult, and a radar dedicated to detecting only the airport ground is absolutely necessary even in a poor visibility environment at night or due to bad weather.

A radar used for this purpose is referred to as airport surface detection equipment (ASDE).

Meanwhile, air traffic tasks are divided into approach control tasks, airfield control tasks, and area control tasks, and the airfield control tasks include ramp control tasks. The ramp control tasks are to guide aircraft on the ground at the airport apron and to control the movement of departing and arriving aircraft in the apron.

In the absence of a ramp controller, a ground controller performs these tasks.

An airfield, such as an airport, is generally divided into a movement area and a non-movement area. The movement area includes a maneuvering area and an apron and is a part of the airfield used for take-off, landing, and taxiing of aircraft.

A specific clearance for entry into the movement area from an airport/heliport with a control tower should be acquired from the air traffic authorities.

The apron is a designated area of a land airfield in which passengers, mail, and cargo may be loaded and unloaded or fueling, parking, or maintenance may be performed. The non-movement area includes a taxiway and an apron area that are not under air traffic control.

Airfield control is divided into ramp control and ground control. Ramp control is a control service provided to aircraft moving within a ground apron area among airfield control services. In general, a control tower which performs airfield control tasks also performs ramp control tasks.

Ramp control tasks include engine start-up and push back of aircraft within the ramp control area, ground movement permission for taxiway entry, and control of ground handling vehicles and personnel. The ramp controller should transfer the control right to the ground controller before the aircraft leaves the apron and enters the taxiway which is under the control of the ground controller. Likewise, the ground controller should transfer the control right to the ramp controller before the aircraft leaves the taxiway and enters the apron.

To ensure safety in such airports, various high-end technologies, equipment, and new operating systems are under development.

However, major and minor aircraft accidents frequently occur due to various factors such as unexpected weather, equipment faults, mistakes of controllers and pilots, and the like.

Therefore, to ensure the safety of aircraft, it is essential to protect the aircraft and passengers and smooth the flow of traffic in the airport by complementing and upgrading the system in double or triple layers.

In addition, when an aircraft takes off and lands on an existing airport runway, the control tower acquires object information of the airport through a radar to designate the aircraft's route and guides the aircraft to its destination through guide lights (airfield lights) of the designated route.

However, information on all of multiple objects other than aircraft on the airport runway is received through the radar, and thus it is difficult to rapidly find necessary information on an aircraft.

Therefore, it is necessary to develop an improved system and method for aircraft ground guidance and control which enable rapid acquisition of location information of an aircraft.

DISCLOSURE

Technical Problem

The present invention is directed to providing a system and method for aircraft ground guidance and control in which Global Positioning System (GPS) coordinate values of fixed location information of airfield lights are input to a server for management and that enable a location that an aircraft passes to be accurately found and the aircraft and the airfield lights to be guided and controlled in real time when coordinate information of the aircraft moving in a radar corresponds to the coordinates of the fixed airfield lights.

Technical Solution

One aspect of the present invention provides a system and method for aircraft ground guidance and control, the method including inputting Global Positioning System (GPS) coordinate values of fixed location information of all controllable and monitorable airfield lights which are installed in an airfield to a server for management, determining in real time whether coordinate information of an aircraft moving in a radar corresponds to the coordinates of the fixed airfield lights, and specifying a location of the aircraft and guiding and controlling airfield lights that the aircraft passes when the coordinate information of the aircraft corresponds to the fixed coordinates of the airfield lights.

GPS coordinate values of an apron in which no guide light is installed may be input to the server at certain distances, and the location of the aircraft may be tracked when the coordinate information of the aircraft corresponds to the GPS coordinate values of the apron.

Arrival and leaving of the aircraft at a bridge or spot in the apron without airfield lights may be tracked in real time by converting latitude and longitude coordinates received from the radar monitoring the aircraft into GPS information.

A zoom camera or a drone camera may be provided at each of a runway strip and a center of a runway which correspond to a takeoff route and a landing route of the aircraft in the airfield so that image information for checking a body, lights, landing gear, and an engine of the aircraft taking off or landing even in a low visibility condition may be provided to a controller.

Fifth generation (5G) lidars may be installed in a runway, a parallel taxiway, and a rapid-exit taxiway to interoperate with airport surface detection equipment (ASDE) in real time and accurately track locations of an aircraft and a vehicle moving on the runway, the parallel taxiway, and an apron.

A call sign of an aircraft receiving permission to land from the air may be tracked by linking a secondary surveillance radar (SSR), the ASDE, and the 5G lidar sensors and the call sign may be automatically attached even when the landing aircraft turns off a transponder so that the server tracks the location of the aircraft until the aircraft takes off after being parked at a bridge or spot.

When the aircraft having touched down approaches the rapid-exit taxiway, a taxiway, the parallel taxiway, the apron, and a docking system from the runway, a stopping distance according to an aircraft type and left and right driving guidance for docking may be provided to a monitor as information using an infrared camera for a pilot to safely dock the aircraft.

The aircraft leaving the bridge for takeoff may be detected by a camera sensor, the aircraft leaving the spot may detect a signal indicating that fixed coordinates correspond to moving GPS coordinates, and in this case, the server may track the location of the aircraft by automatically tagging a call sign of the returning aircraft until the aircraft takes off.

Tracking the location of the vehicle moving in the airfield and the apron may include attaching a two-way communication GPS device to the vehicle to prevent a collision between the vehicle and the aircraft and guide external fire trucks and emergency vehicles to an accident site when an aircraft accident occurs.

To automatically and safely guide aircraft, a system for causing various airfield lights installed on the ground to interoperate with flight safety equipment (an instrument landing system (ILS), a very high frequency (VHF) omnidirectional range (VOR), distance measurement equipment (DME), a glide path (GP), tactical air navigation (TACAN), an aerodrome meteorological observation system (AMOS), and a precision approach path indicator (PAPI)) may be built on the server, and information about whether there is a problem with the equipment may be provided to a controller.

An air radar and airport surface detection equipment (ASDE) may interoperate with each other, and the server may calculate a landing time of the aircraft and a takeoff time of the aircraft to automatically control landing and takeoff.

A three-dimensional (3D) image for accurately determining situations of the runway, the parallel taxiway, and the apron in real time may be provided to the controller.

Advantageous Effects

According to a system and method of the present invention, Global Positioning System (GPS) coordinate values of fixed location information of airfield lights are input to a server for management, and thus when coordinate information of an aircraft moving in a radar corresponds to the coordinates of the fixed airfield lights, it is possible to accurately find a location that the aircraft passes and guide and control the aircraft and the airfield lights in real time.

BEST MODE OF THE INVENTION

Hereinafter, exemplary embodiments of the present invention will be described in detail with reference to the accompanying drawings.

Figure 1:
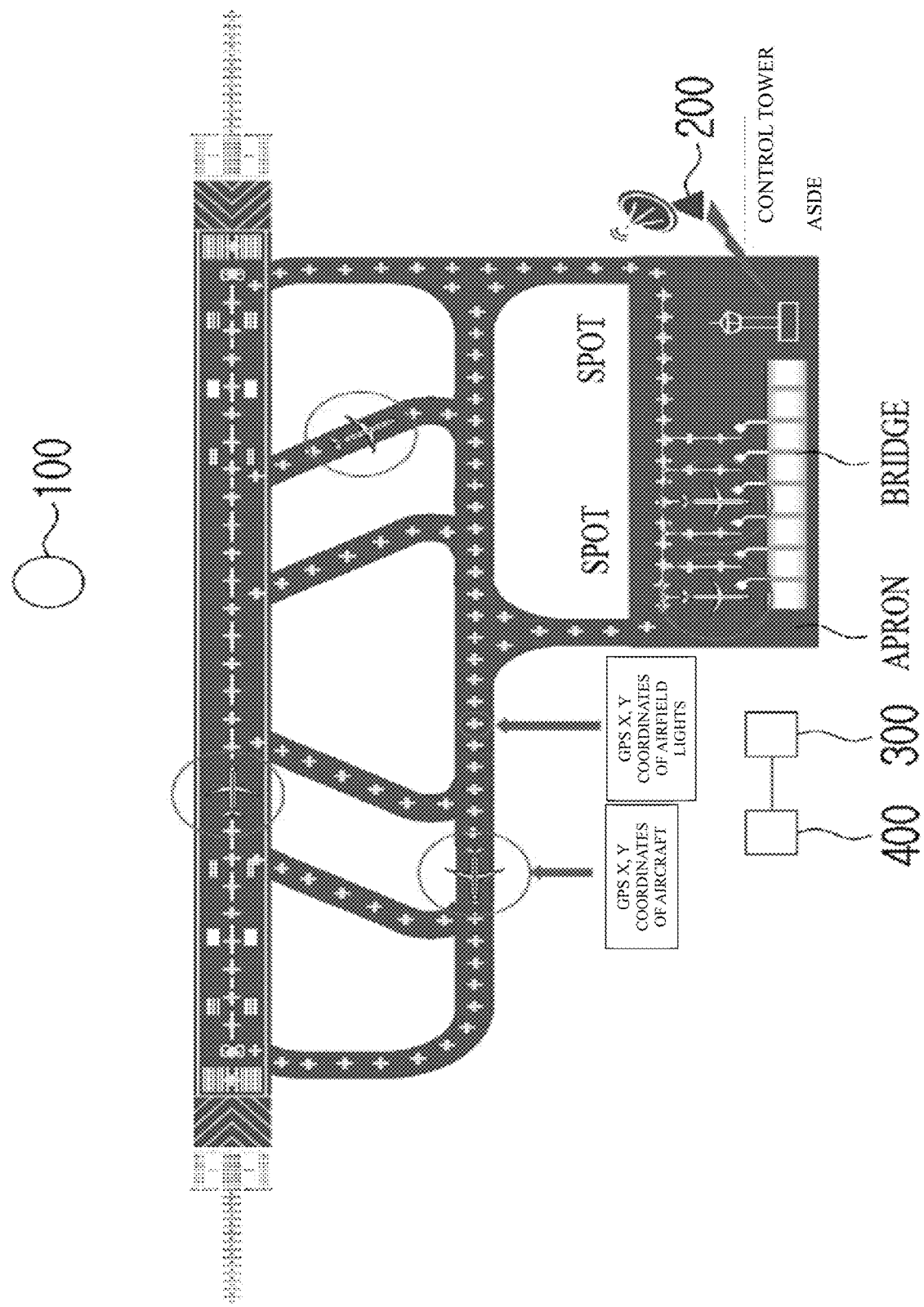
FIG. 1 is a diagram of a system for aircraft ground guidance and control according to the present invention.
Figure 2:
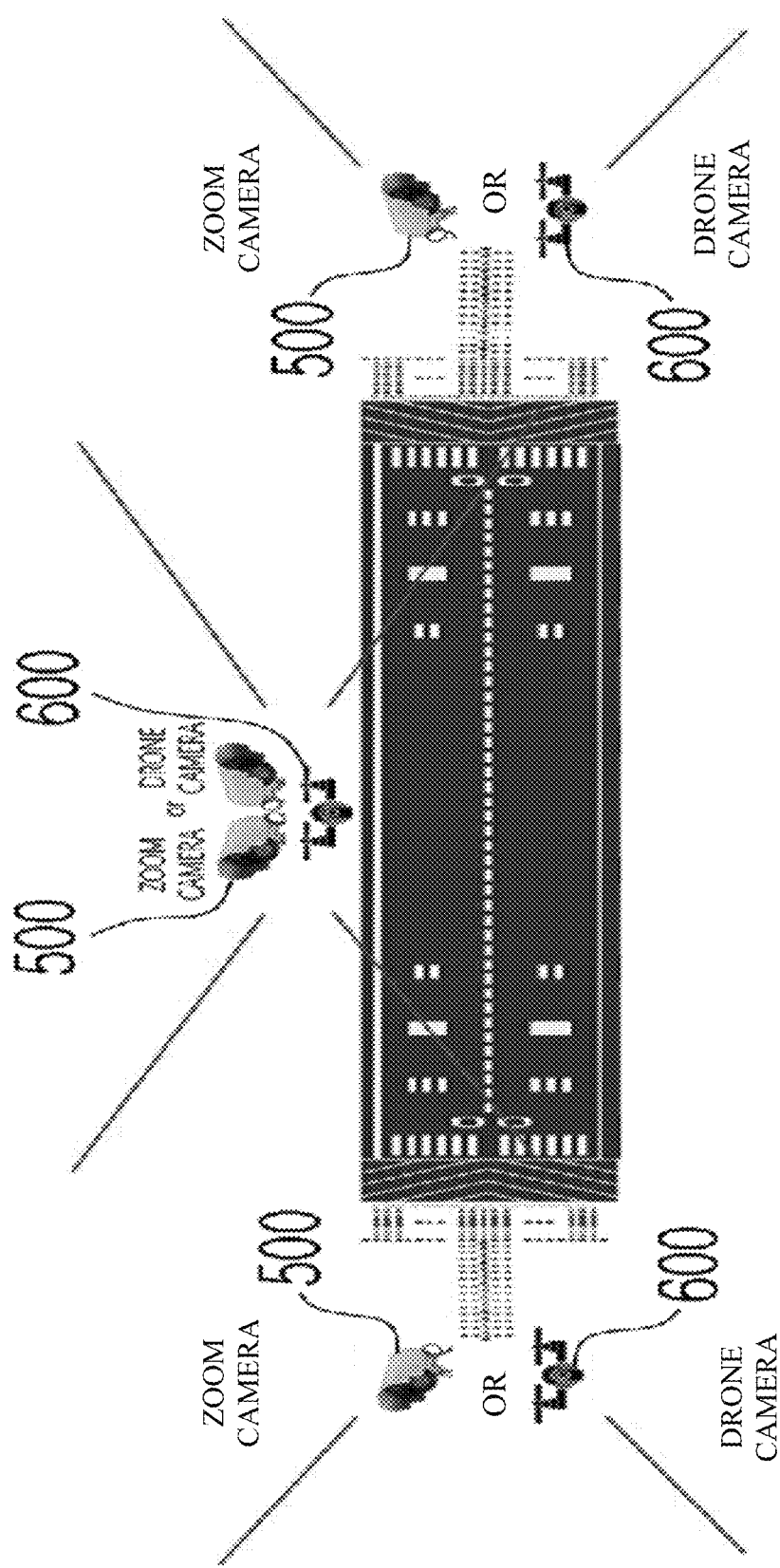
FIG. 2 is a diagram of a runway strip and a runway of the system for aircraft ground guidance and control according to the present invention.
Figure 3:
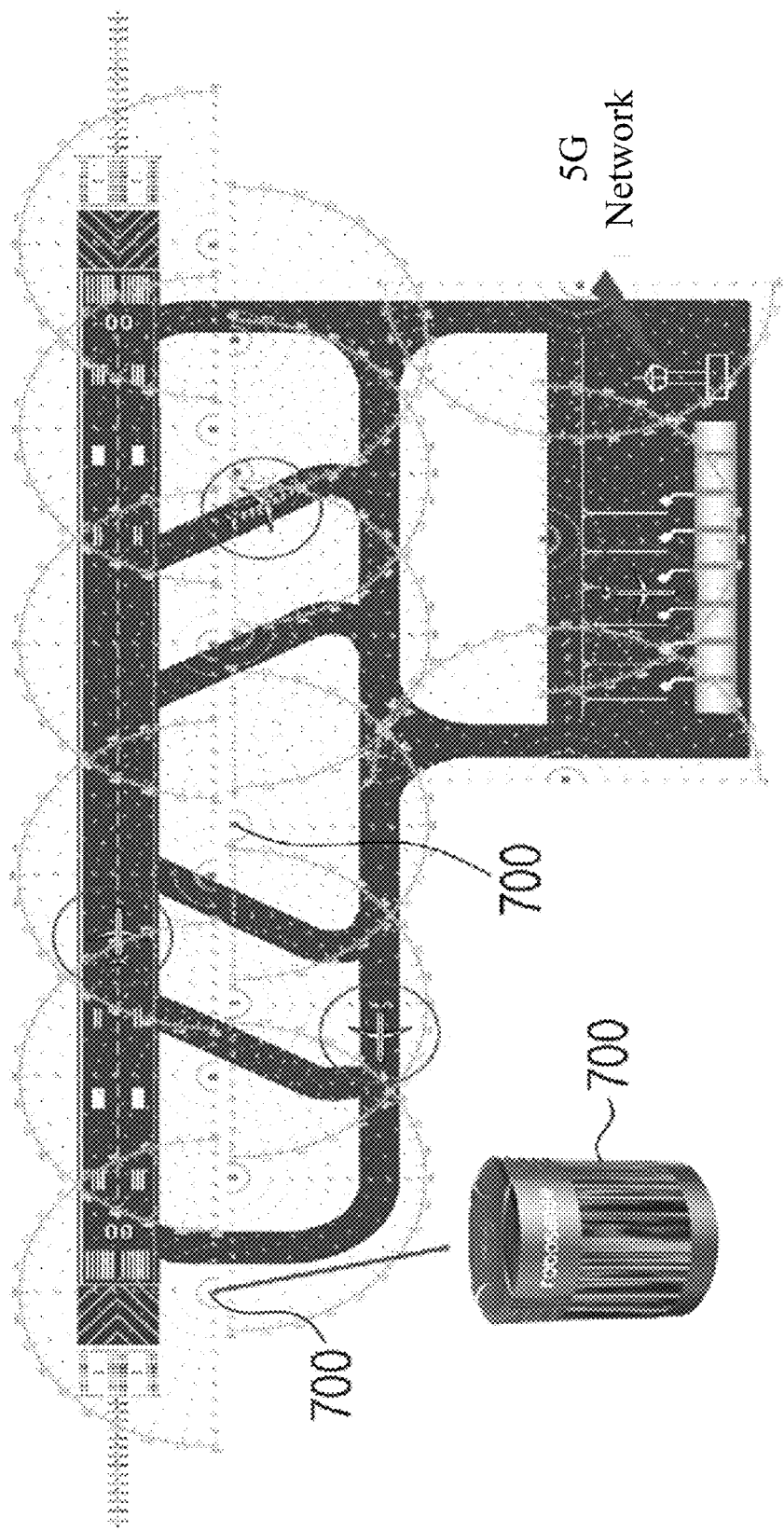
FIG. 3 is a diagram illustrating a situation in which fifth generation (5G) light detection and ranging (lidar) sensors are applied to the system for aircraft ground guidance and control according to the present invention.
Figure 4:
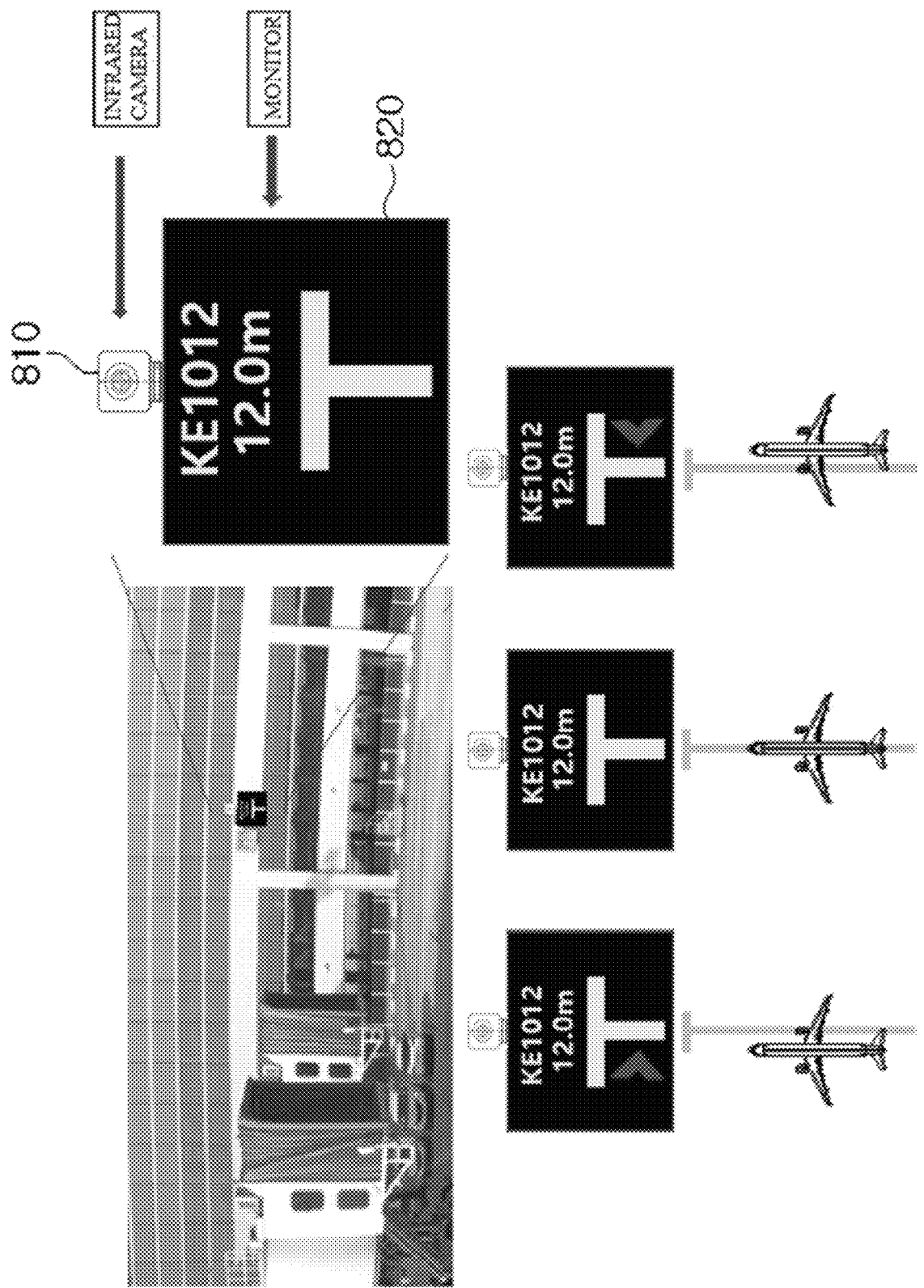
FIG. 4 is a diagram illustrating an apron of the system for aircraft ground guidance and control according to the present invention.
Figure 5:
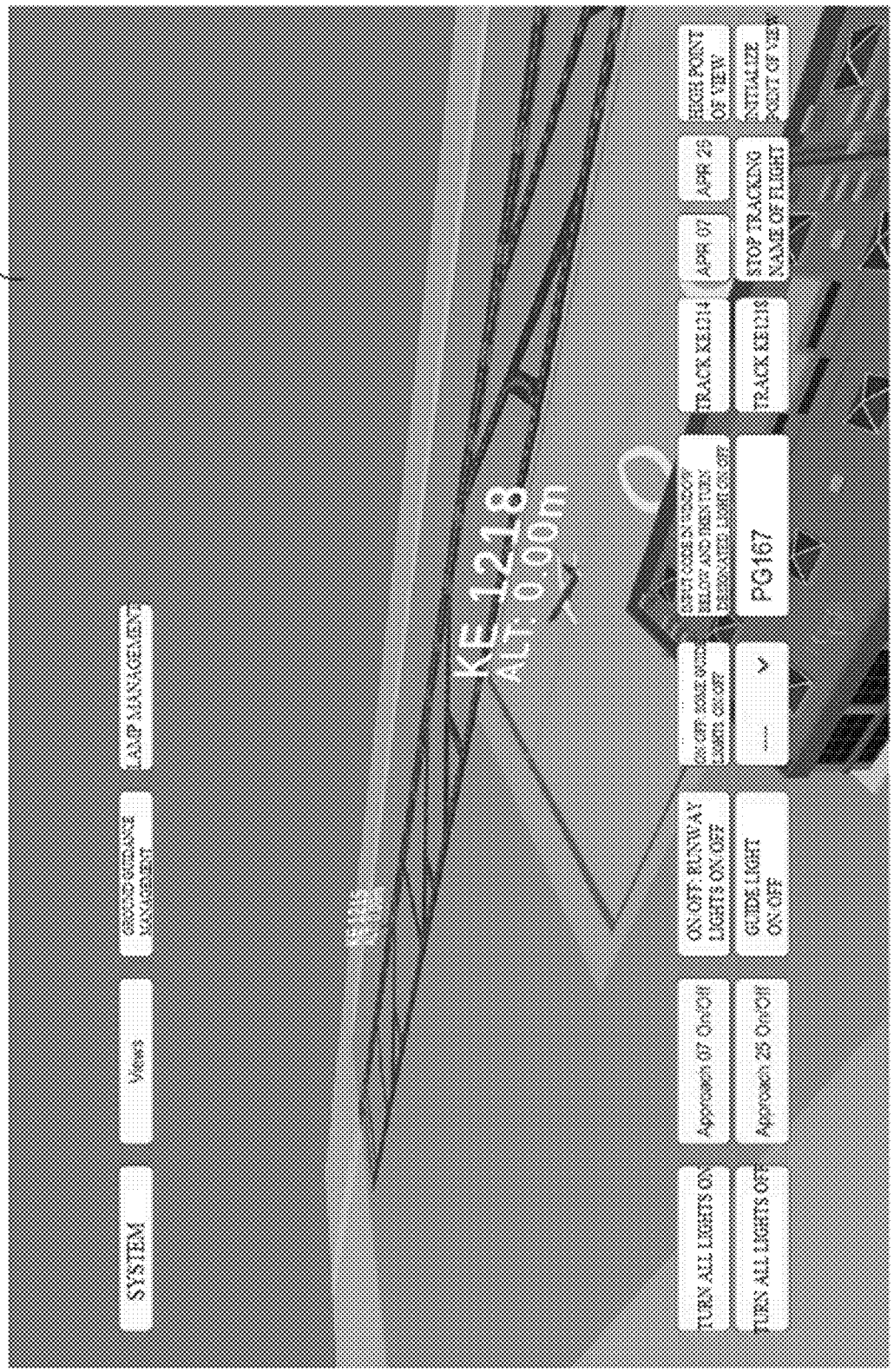
FIG. 5 is a three-dimensional (3D) image of the system for aircraft ground guidance and control according to the present invention.

FIG. 1 is a diagram of a system for aircraft ground guidance and control according to the present invention, FIG. 2 is a diagram of a runway strip and a runway of the system for aircraft ground guidance and control according to the present invention, FIG. 3 is a diagram illustrating a situation in which fifth generation (5G) lidars are applied to the system for aircraft ground guidance and control according to the present invention, FIG. 4 is a diagram illustrating an apron of the system for aircraft ground guidance and control according to the present invention, and FIG. 5 is a three-dimensional (3D) image of the system for aircraft ground guidance and control according to the present invention.

As shown in FIGS. 1 to 5, the system for aircraft ground guidance and control according to the present invention includes a secondary surveillance radar (SSR) 100 for monitoring aircraft and airport surface detection equipment (ASDE) 200 for monitoring aircraft.

Also, the system further includes a control unit 300 that receives location data of an aircraft from the SSR 100 and the ASDE 200.

The control unit 300 is a system server 400 that monitors equipment states of flight safety equipment (an approach lighting system (ALS), a very high frequency (VHF) omnidirectional range (VOR), distance measurement equipment (DME), tactical air navigation (TACAN), and an instrument landing system (ILS)), an aerodrome meteorological observation system (AMOS), and the like interoperating with an aeronautic system, and immediately transmits information to a controller when there is a problem, fully ensuring the safety of aircraft approaching an airfield.

As shown in FIG. 2, zoom cameras 500 and drone cameras 600 are provided in runway strips of the airfield which are a takeoff route and a landing route of aircraft.

Meanwhile, as shown in FIG. 3, 5G lidars 700 are provided in a parallel taxiway and a rapid-exit taxiway.

Also, as shown in FIG. 4, infrared cameras 810 and monitors 820 are provided in the apron.

As shown in FIG. 5, a 3D image 900 for accurately determining situations of a runway, the parallel taxiway, and the apron in real time is provided to the controller.

A method for aircraft ground guidance and control according to the present invention will be described below.

First, Global Positioning System (GPS) coordinate values of fixed location information of all controllable and monitorable airfield lights which are installed in the airfield are input to the server 400 for management, and it is determined in real time whether coordinate information of an aircraft moving in the radars 100 and 200 corresponds to the coordinates of the fixed airfield lights. When the coordinate information of an aircraft corresponds to the coordinates of the fixed airfield lights, a location of the aircraft is specified, and the control unit 300 guides and controls airfield lights that the aircraft passes.

Also, GPS coordinate values of an apron in which no guide light is installed are input to the server at certain distances, and the location of the aircraft is tracked when the coordinate information of the aircraft corresponds to the GPS coordinate values of the apron.

Subsequently, latitude and longitude coordinates received from the radars 100 and 200 monitoring the aircraft are converted into GPS information, and arrival and leaving of the aircraft at a bridge or spot in the apron without airfield lights is tracked in real time.

Also, the zoom camera 500 or the drone camera 600 is provided at each of the runway strips and the center of the runway which correspond to a takeoff route and a landing route of the aircraft in the airfield so that image information for checking a body, lights, landing gear, and an engine of the aircraft taking off or landing even in a low visibility condition is provided to a controller.

Subsequently, 5G lidars 700 are installed in the runway, the parallel taxiway, and the rapid-exit taxiway to interoperate with the ASDE 200 in real time and accurately track locations of an aircraft and a vehicle moving on the runway, the parallel taxiway, and the apron.

Also, a call sign of an aircraft receiving permission to land from the air is tracked by linking the SSR 100, the ASDE 200, and the 5G lidars 700, and the call sign is automatically attached even when the landing aircraft turns off a transponder so that the location of the aircraft is tracked until the aircraft takes off after being parked at the bridge or spot.

Subsequently, when the aircraft having touched down approaches the rapid-exit taxiway, the taxiway, the parallel taxiway, the apron, and a docking system from the runway, a stopping distance according to an aircraft type and left and right driving guidance for docking are provided to a monitor 820 as information using the infrared camera 810 for a pilot to safely dock the aircraft.

Also, the aircraft leaving the bridge for takeoff is detected by a camera sensor, and the aircraft leaving the spot detects a signal indicating that fixed coordinates correspond to moving GPS coordinates. In this case, the server tracks the location of the aircraft by automatically tagging a call sign of the returning aircraft until the aircraft takes off.

Subsequently, to track the locations of the vehicle moving in the airfield and the apron, a two-way communication GPS device is attached to the vehicle. Accordingly, a collision between the vehicle and the aircraft is prevented, and when an aircraft accident occurs, external fire trucks and emergency vehicles are guided to an accident site.

To automatically and safely guide aircraft, a system for causing various airfield lights installed on the ground to interoperate with flight safety equipment (an ILS, a VOR, DME, a glide path (GP), TACAN, an AMOS, and a precision approach path indicator (PAPI)) is built on the server 400, and information about whether there is a problem with the equipment is provided to the controller.

Subsequently, the SSR 100 and the ASDE 200 interoperate with each other, and the server 400 calculates a landing time of the aircraft and a takeoff time of the aircraft to automatically control landing and takeoff.

Also, a 3D image 900 for accurately determining situations of the runway, the parallel taxiway, and the apron in real time is provided to the controller.

According to the present invention, GPS coordinate values of fixed location information of airfield lights are input to a server for management. When coordinate information of an aircraft moving in a radar corresponds to the coordinates of the fixed airfield lights, it is possible to accurately find a location that the aircraft passes and guide and control the aircraft and the airfield lights in real time.

Although exemplary embodiments of the present invention have been described in detail, the technical scope of the present invention is not limited thereto but should be interpreted according to the following claims. In this case, those of ordinary skill in the art should appreciate that various alterations and modifications can be made without departing from the scope of the present invention.

I claim:

1. A method for aircraft ground guidance and control, the method comprising:
   inputting location information of controllable and monitorable airfield lights which are installed in an airfield to a server for management, the location information of the airfield lights including global positioning system (GPS) coordinate values;
   determining in real time whether coordinate information of an aircraft moving in a radar corresponds to the location information of one or more of the airfield lights; and
   when the coordinate information of the aircraft corresponds to the location information of the one or more of the airfield lights, specifying a location of the aircraft and guiding and controlling the one or more of the airfield lights that the aircraft passes,
   wherein fifth generation (5G) lidars are installed in a runway, a parallel taxiway, and a rapid-exit taxiway to interoperate with airport surface detection equipment (ASDE) in real time and track the location of the aircraft and a location of a vehicle moving on the runway, the parallel taxiway, and an apron.

2. The method of claim 1, wherein location information of an apron in which no guide light is installed is input to the server at distances, the location information of the apron including GPS coordinate values, and
   the location of the aircraft is tracked when the coordinate information of the aircraft corresponds to the location information of the apron.

3. The method of claim 2, wherein arrival and leaving of the aircraft at a bridge or spot in the apron is tracked in real time by converting latitude and longitude coordinates received from the radar monitoring the aircraft into GPS information.

4. The method of claim 1, wherein a zoom camera or a drone camera is provided at each of a runway strip and a center of the runway which correspond to a takeoff route and a landing route of the aircraft in the airfield so that image information for checking a body, lights, a landing gear, and an engine of the aircraft taking off or landing is provided to a controller.

5. The method of claim 1, wherein a call sign of an aircraft receiving permission to land from air is tracked by linking a secondary surveillance radar (SSR), the ASDE, and the 5G lidars, and
   the call sign is automatically attached even when the landing aircraft turns off a transponder so that the server tracks the location of the aircraft until the aircraft takes off after being parked at a bridge or spot.

6. The method of claim 5, wherein, when the aircraft having touched down approaches a docking system from the runway, a stopping distance according to an aircraft type and left and right driving guidance for docking are provided to a monitor as information using an infrared camera for a pilot to dock the aircraft.

7. The method of claim 6, wherein the aircraft leaving the bridge for takeoff is detected by a camera sensor, the aircraft leaving the spot detects a signal indicating that fixed coordinates correspond to moving GPS coordinates, and the server tracks the location of the aircraft by automatically tagging a call sign of a returning aircraft until the returning aircraft takes off.

8. The method of claim 7 further comprising tracking the location of the vehicle moving in the airfield and the apron, the tracking of the location of the vehicle including attaching a two-way communication GPS device to the vehicle to prevent a collision between the vehicle and the aircraft and guide external fire trucks and emergency vehicles to an accident site when an aircraft accident occurs.

9. The method of claim 8, wherein, to automatically guide the aircraft, a system for causing airfield lights installed on the ground to interoperate with flight safety equipment, including an instrument landing system (ILS), a very high frequency (VHF) omnidirectional range (VOR), distance measurement equipment (DME), a glide path (GP), tactical air navigation (TACAN), an aerodrome meteorological observation system (AMOS), and a precision approach path indicator (PAPI), is built on the server, and information about whether there is a defect in the system is provided to a controller.

10. The method of claim 9, wherein an air radar and the ASDE interoperate with each other, and the server calculates a landing time of the aircraft and a takeoff time of the aircraft to automatically control landing and the takeoff.

11. The method of claim 10, wherein a three-dimensional (3D) image for determining situations of the runway, the parallel taxiway, and the apron in real time is provided to the controller.

\* \* \* \* \*